United States Patent
Chou et al.

(10) Patent No.: US 8,706,784 B2
(45) Date of Patent: *Apr. 22, 2014

(54) TIME-DOMAIN GATED FILTER FOR RF COMMUNICATION SYSTEMS

(71) Applicant: The Aerospace Corporation, El Segundo, CA (US)

(72) Inventors: Jason T. Chou, Saint Paul, MN (US); Todd S. Rose, Redondo Beach, CA (US); Joshua A. Conway, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,202

(22) Filed: Apr. 12, 2013

(65) Prior Publication Data

US 2013/0235443 A1    Sep. 12, 2013

Related U.S. Application Data

(63) Continuation of application No. 11/978,251, filed on Oct. 29, 2007, now Pat. No. 8,443,024.

(51) Int. Cl.
*G06F 17/10* (2006.01)
*H04J 14/02* (2006.01)

(52) U.S. Cl.
USPC .............................. 708/300; 398/85; 398/149

(58) Field of Classification Search
USPC ..................................... 708/300; 398/85, 149
See application file for complete search history.

(56) References Cited

U.S. PATENT DOCUMENTS

| | | | |
|---|---|---|---|
| 6,400,869 B2 * | 6/2002 | Pan et al. | 385/37 |
| 6,525,857 B1 * | 2/2003 | Way et al. | 398/192 |
| 6,721,506 B1 * | 4/2004 | Lam | 398/70 |
| 8,443,024 B2 * | 5/2013 | Chou et al. | 708/300 |
| 2005/0271393 A1 * | 12/2005 | Gnauck et al. | 398/186 |

* cited by examiner

*Primary Examiner* — Chuong D Ngo
(74) *Attorney, Agent, or Firm* — Jones Day; Jaime D. Choi

(57) ABSTRACT

A time domain filter receives a double sideband (DSB) input in the frequency domain and compresses this input into a time domain signal filtered by a time gate for providing a time filtered signal that is then expanded back into the frequency domain as a single sideband (SSB) output with one sideband being filtered by the time gate for translating DSB signals into SSB signals well suited for communicating chirped modulated signals as SSB signals along an electrical line or optical fiber without dispersive nulling of the communicated signal.

16 Claims, 2 Drawing Sheets

RF TIME DOMAIN FILTER

GATE TIMING

OPTICAL TIME DOMAIN FILTER

TIME-DOMAIN GATED FILTER FOR RF COMMUNICATION SYSTEMS

CROSS-REFERENCE TO RELATED APPLICATIONS

This application is a continuation under 35 U.S.C. §120 of U.S. patent application Ser. No. 11/978,251, filed Oct. 29, 2007 and entitled "Time-Domain Gated Filter for RF Communication Systems," the entire contents of which are incorporated by reference herein.

FIELD OF THE INVENTION

The invention relates to the field of electromagnetic signal filtering. Particularly, the present invention relates gated time domain filters for generating a single side band signal derived from a chirp modulated electromagnetic signal, including electrical and optical signals.

BACKGROUND OF THE INVENTION

As is well known, the performance and bandwidth of fiber-optic communication systems are limited by chromatic dispersion, whereby different frequencies propagate at different speeds along the fiber-optic path. Authors G. H. Smith, D. Novak, and Z. Ahmed teach "A Technique for optical SSB generation to overcome dispersion penalties in fibre-radio systems," in the Electronic Letters at volume 33, at number 1, in 1997. Authors K. Yonenaga and N. Takachio teach a "A fiber chromatic dispersion compensation technique with an optical SSB transmission in optical homodyne detection systems," in the IEEE Photonics Technology Letters, at volume 5, in pages 949-951, in 1993. Dispersion in analog optical links creates frequency transmission nulls, which are known as dispersion penalties, that cause a loss of information, usually shown as dispersive nulls. This dispersive nulling effect is caused by the deconstructive interference between the upper and lower sidebands of a double sideband (DSB) modulated signal. This effect is at its worst when the upper and lower sidebands are exactly 180 degrees out of phase with each other, completely annihilating the signal. A well-known method to avoid these dispersive penalties is to use only single sideband (SSB) modulation. In the SSB approach, one of the two frequency sidebands produced during DSB modulation is eliminated. Typically, optical SSB modulation is realized by an RF phase shifting technique, which at the present level of technology, has a bandwidth limitation around 18 GHz.

There are two primary methods to achieve optical SSB modulation, including the phase discrimination method and the optical filtering method. The phase discrimination method requires a RF hybrid coupler and balanced optical modulator. The bandwidth capability of available RF hybrid couplers, however, is currently disadvantageously limited to an upper range of 18 GHz. In the optical filtering method, optical filtering is realized by an optical bandpass filter to remove either the upper or lower sideband of the RF signal. This optical filtering method, however, is possible only when the optical carrier frequency is fixed and stable.

In many applications, such as time-stretched photonic analog-to-digital converters, the optical carrier frequency is swept, that is chirped, by linearly varying carrier frequency in time. Authors Y. Han and B. Jalali, teach a "Photonic Time-Stretched Analog-to-Digital Converter," in the Journal of Lightwave Technology, in volume 12, at pages 3085-3103, in The time-stretched photonic analog-to-digital converter may include an input D1 dispersive element to provide a chirped carrier, an electrical-to-optical modulator modulating a chirped carrier by a baseband signal communicated along an optical fiber function as a second D2 dispersive element. The optical signal is then communicated along the optical fiber to an optical-to-electrical photodetector. The time-stretched photonic analog-to-digital converter functions as an optical preprocessor whereby an RF signal is stretched by a factor M=(D1+D2)/D1. Upon optical-to-electrical conversion, the time-stretched photonic analog-to-digital converters increase the effective bandwidth of an electronic analog-to-digital converter. For example, a 4 GHz bandwidth analog-to-digital converter combined with a time-stretch preprocessor of M=250 will result in a 100 GHz bandwidth analog-to-digital converter. Under normal operating conditions, the preprocessor will suffer a frequency fading penalty caused by the double sideband signals. However, there is currently no broadband SSB modulation solution for chirped optical signals. This SSB signal format is preferred over traditional double sideband modulated signals in order to avoid frequency fading and information loss in the optical fiber. Electrical and optical processing systems have long used compressors for translating frequency domain signals into time domain signals. Electrical and optical processing systems have long used expanders for translating time domain signals into frequency domain signals. Such compressors and expanders are typically simple dispersive elements such as dispersive transmission lines or chirped gratings. An expander could be a portion of an optical fiber. However, compressing and expanding in the frequency domain does not remove a sideband from double sideband signals, and hence, are unsuitable in tandem for communicating chirped modulated double sideband signals without dispersive nulling.

The Mach-Zehnder modulator is an optical modulator widely used in the telecommunications industry to generate digital waveforms, the most common being on-off keying. The Mach-Zehnder modulator device may use waveguide interferometers with electrodes used to impart path length changes. The path length changes can be selected to cause total constructive and destructive interference at the output port, or full on or off operations. Mach-Zehnder modulators are routinely used in 40 Gbps links and some have been demonstrated with bandwidths capable of supporting 100 GHz modulation. Typical Mach-Zehnder modulators exhibit extinction ratios of 100:1 or better. Mach-Zehnder modulators offer ultra high frequency modulations. Mach-Zehnder modulators have been used in optical systems.

Compressing a modulated chirped optical carrier in time produces a waveform, which mirrors the shape of the RF frequency spectrum. Previously, this known compression property has been used to measure RF spectra in the time domain. In a well understood phenomenon, analogous to spatial diffraction, a convolution occurs between the transform-limited pulse and the RF frequency spectrum of the input signal. Authors R. Saperstein, D. Panasenko, and Y. Fainman, teach a "Demonstration of a microwave spectrum analyzer based on time-domain optical processing in fiber," in Optics Letters, at volume 29, at pages 501-503, in 2004. Also, chirped Bragg gratings have been used to process chirped signals but suffer from fabrication introduced phase error such as residual group delay ripple, which in turn disadvantageously distorts the signal. Author R. Kashyap teaches "Fiber Bragg Gratings," in the Academic Press, of San Diego, in 1999. However, fiber Bragg gratings do not inherently filter sidebands. Communication of chirp optical signals along optical fibers disadvantageously produces dispersive nulling. These and other disadvantages are solved or reduced using the invention.

SUMMARY OF THE INVENTION

An object of the invention is to provide time domain filtering of an input signal in the frequency domain.

Another object of the invention is to provide time domain filtering of a double sideband input signal in the frequency domain.

Yet another object of the invention is to provide time domain filtering of a double sideband input signal in the frequency domain and providing a single sideband output signal in the frequency domain.

Still another object of the invention is to provide time domain filtering of a double sideband input signal in the frequency domain and providing a single sideband output signal in the frequency domain well suited for communications along an optical fiber.

A further object of the invention is to provide time domain filtering using a compressor for compressing an input signal from the frequency domain to the time, using a time gate for time domain filtering of signal components of the input signal, and using an expander for expanding a time domain filter signal into an output signal in the frequency domain.

Yet a further object of the invention is to provide time domain filtering using a compressor for compressing an input signal from the frequency domain to the time, using a time gate for time domain filtering of signal components of the input signal, and using an expander for expanding a time domain filter signal into an output signal in the frequency domain that may be in the electrical or optical regime.

The invention is directed to a time domain filter used for communicating single sideband signals (SSBs). The time domain filter receives a double sideband (DSB) input in the frequency domain. The input is preferably in the electrical or optical regimes. The time domain filter compresses this DSB input into a time domain signal that is then filtered by a time gate for providing a time filtered signal. The filtered signal is then expanded back into the frequency domain as a SSB output with one sideband being filtered by the time gate. As such, the time domain filter translates a DSB signal input into an SSB signal output. The SSB output is particularly well suited for communicating chirped modulated signals as SSB signals along an optical fiber without dispersive nulling associated with communicating DSB signals along optical fibers. The time domain filter can also be applied to DSB electrical signals generated from chirped modulated electrical signals. The time domain filter is preferably applied to optical filtering to achieve single sideband modulation for wideband analog signals modulating on a swept optical carrier that is chirped modulated. The time domain filter is capable of generating single sideband signals with improved bandwidths that can be greater than 100 GHz. These and other advantages will become more apparent from the following detailed description of the preferred embodiment.

DETAILED DESCRIPTION OF THE PREFERRED EMBODIMENT

Figure 1:
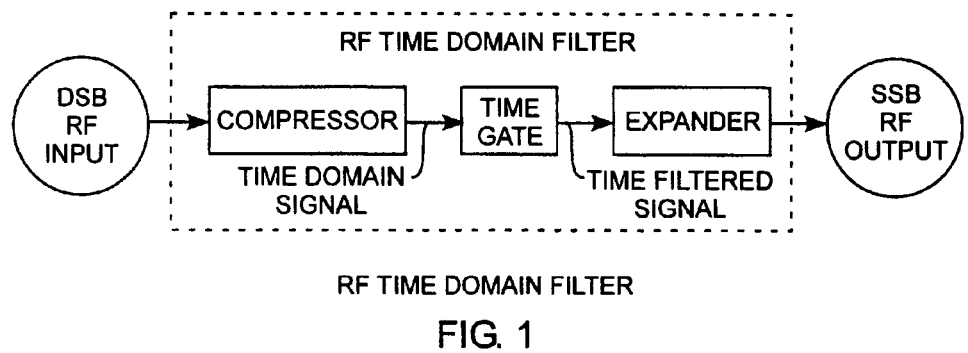
FIG. 1 is a block diagram of an RF time domain filter operating in the electrical regime.

An embodiment of the invention is described with reference to the figures using reference designations as shown in the figures. Referring to FIG. 1, an RF time domain filter receives a double sideband (DSB) input signal and provides a single sideband (SSB) output signal. The DSB input signal is designated as a DSB RF input and the SSB output signal is designated as a SSB RF output for indicating that the time domain filter is operating in the electrical regime. The DSB input refers to the conventional double side band modulation onto a chirped carrier. The DSB input is in frequency domain. The RF time domain filter comprises a compressor for compressing by translation the DSB input in the frequency domain into a time domain signal in the time domain. Thus the output of the compressor in the time domain has the same features as the spectrum in the frequency domain.

A time gate is used to filter the signal in the time domain. This time gate can be made of any switch which can on/off modulate the signal. In the optical domain, this may consist of a Mach Zhender Modulator or semiconductor optical modulator. The filtered time domain signal is then expanded by an expander for translating the filtered time domain signal into the SSB output signal. Broadly, the time domain filter is used to remove in the time domain frequency components of the input such that the output signal is a filtered residual of the input with the output and input signals provided in the frequency domain yet filtered in the time domain. The time domain filter can be used to filter out time domain separated frequency components of the input signal. In the preferred form, the time domain filter serves to filter out one of the sidebands of the DSB input signal, such as a lower sideband signal. The DSB input signal can be generated using various input signals and carrier modulations. The DSB input signal is generated using chirped carrier modulations so that translated time domain components are separated in time so that one or more components of the time domain signal can be filtered by time domain filters. The time-domain filter can operate in the electrical or optical regimes for an arbitrary RF input signal. The output signal can be communicated through any communication medium, such as electrical wires, optical fibers, and free space.

The time gate can comprise a filter and a detector both not shown, but receiving the DSB signal. The detector detects the center signal in time and provides a gate time signal that drives the filter to filter out the upper sideband signal thereby providing a SSB output in the time domain. The SSB output in the time domain can be expanded by an expander to product the SSB signal. This exemplar time gate can be implemented in both the electrical and optical domain. Those skilled in the art know how to implement various time gates.

Figure 2:
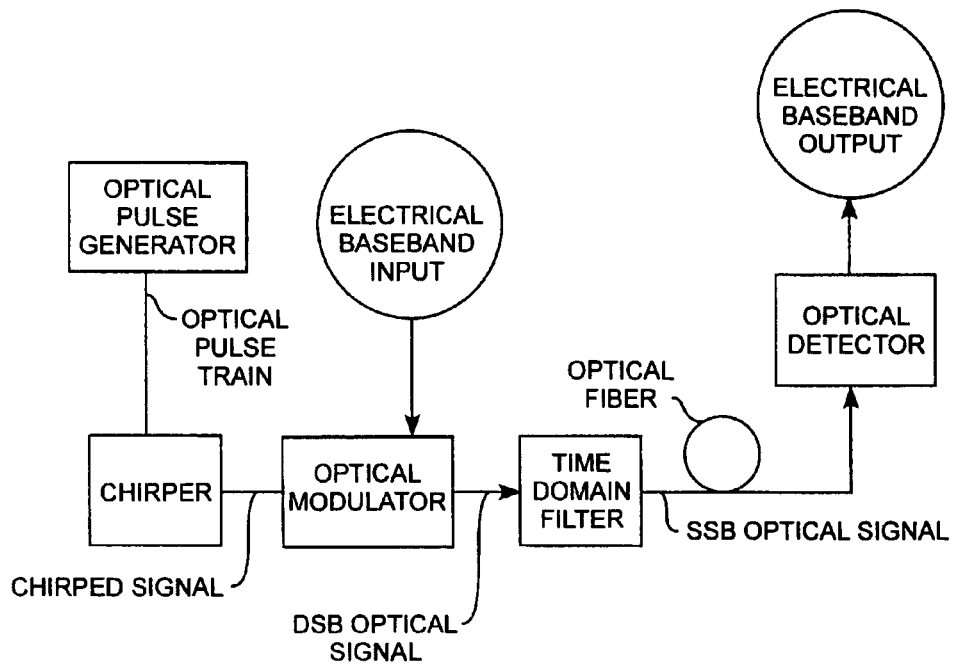
FIG. 2 is a block diagram of a chirped optical channel including a time domain filter.

Referring to FIGS. 1 and 2, and more particularly to FIG. 2, the time domain filter can be used in optical systems operating in part in the optical regime. More particularly, the time domain filter can be used for time domain filtering of optical signals. An optical pulse generator provides an optical pulse train fed to a chirper for providing a chirped signal that is a chirped optical carrier. An electrical baseband signal in fed into an optical modulator for modulating the chirped carrier modulated. The baseband signal could be an analog signal or could be a digital signal for encoding data bit stream. The electrical baseband input preferably encodes a digital baseband signal for communicating a digital data bit stream through an optical fiber for high speed digital communications. During modulation by the optical modulator, the optical modulator generates a DSB optical signal that is in turn fed into the time domain filter. The time domain filter preferably filters one of generated sidebands for providing an SSB optical signal. The SSB optical signal can propagate along the optical fiber without dispersive nulling losses. The SSB optical signal is communicated along the optical fiber to an optical detector for providing an electrical baseband output. The time domain filter would include an optical compressor, a time gate, and an optional optical expander in like configuration to the RF time domain filter, offering electrical regime or optical regime time domain filtering. Regardless of the electrical or optical regime used, the time domain filter compresses using the compressor the frequency domain input into the time domain signal, time domain filters using the time domain signal in the time domain, and expands the time domain filtered signal back into a frequency domain signal, but with an input frequency component filtered in the time domain.

Figure 3:
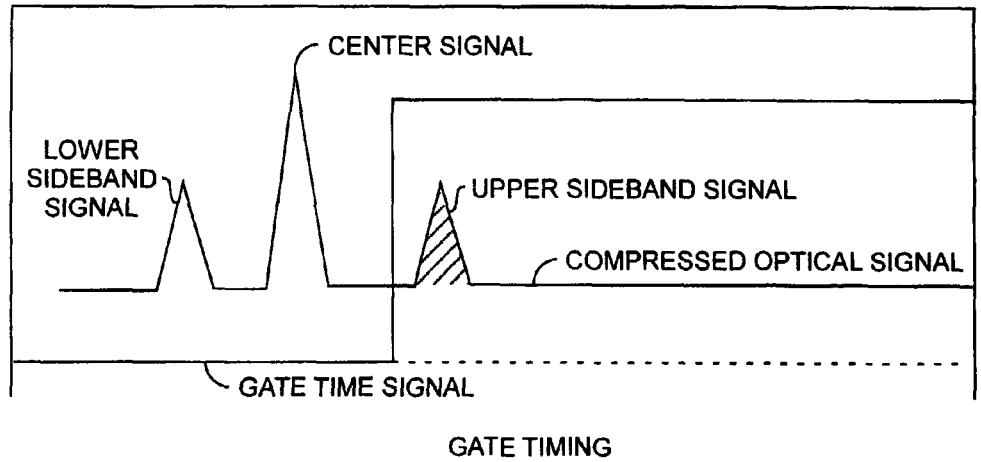
FIG. 3 is a plot of gate timing of a time gate for use in a time domain filter.

Referring to FIGS. 1 through 3, and more particularly to FIG. 3, gate timing is shown in the time domain using a gate time signal. The preferred DSB input signal including a lower sideband signal component, a center signal component, and an upper sideband signal component. The time gate can be a simple time filter using a gate time signal. As shown, the gate time signal separates in time the upper sideband signal component from the center signal component and from the lower sideband signal component. As such, the gate time signal can be used to filter out and remove the upper sideband signal. In the case of operation in the RF electrical regime, conventional electrical components can be used to obtain SSB signals operating up to 18 GHz. In the case of operation in the optical regime, conventional optical components can be used to build the time domain filter, though operation between the compressor and expander may become intermixed in order to achieve ultra high optical frequency operation greater than 18 GHz and up to 100 GHz.

Figure 4:
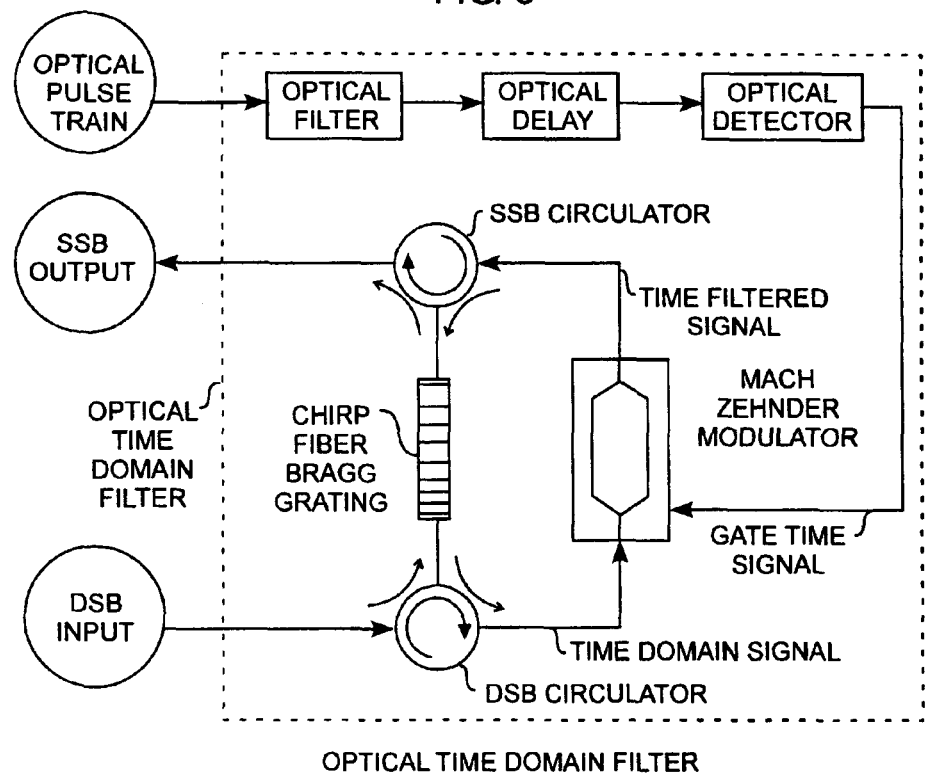
FIG. 4 is an optical time domain filter operating the optical regime.

Referring to all of the Figures and more particularly to FIG. 4, an optical time domain filter preferably receives a DSB input signal and provides a SSB output signal in the optical regime. The preferred optical time domain filter uses a chirped fiber Bragg grating. The optical time domain filter can be made using a chirp fiber Bragg grating disposed between a DSB circulator receiving the DSB input and a SSB circulator providing the SSB output. An optical modulator is also disposed between the circulators. To generate the SSB signal from the DSB signal, the time domain filter can be constructed using standard commercial parts found in the telecommunication industry. The basic components of the time domain filter are the compressor, time gate, and optional expander. The optical compressor can be a dispersion compensating fiber or a grating. The optical time gate can be realized from a Mach-Zehnder modulator. The optical expander can be the same components as a compressor, but with opposite chirp. In the preferred form, the Mach-Zehnder modulator is driven by the time gate signal, which may be a digital RF signal in the electrical regime, which gates the throughput light on and off, thereby generating digital ones and zeros on the optical carrier. The digital ones and zero are used for gate timing.

The insertion loss of the time domain filter is important when conventional optical fiber is used to compress and expand the waveform. The disadvantage of using optical fiber is that the loss of the time domain filter scales proportionally with length of fiber needed to achieve a sufficient dispersion D1. Typical fiber lengths are many kilometers and impart a loss of over 10 dB. To avoid large nulling dispersive losses, the preferred form uses chirped fiber Bragg gratings that have much lower losses due to short lengths. However, typical fabrication errors may introduce phase error, such as residual group delay ripples, which in turn distorts the SSB output signal. The use of a single chirped fiber Bragg grating before and after the time gate filter, however, mitigates the phase error through cancellation.

A modulated pulse proceeds through DSB circulator into the chirped fiber Bragg grating, then back into and out of the DBS circulator as a time domain signal, then through a time gate, which may be a Mach Zehnder modulator providing the time filtered signal, communicated into the SSB circulator, and then into the chirp fiber Bragg grating, but in the reverse direction before exiting as the SSB output. When the signal is circulated by the DSB circulator, the signal is passed through the chirped fiber Bragg grating. When the signal is circulated by the SSB circulator, the signal is again passed through the chirped fiber Bragg grating. Because the signal is launched into the chirped fiber Bragg grating through opposite ends of the chirped fiber Bragg grating, the signal receives a phase shift during the second pass through the SSB circulator that is reciprocal to a phase shift created during the first pass through the DSB circulator. This reciprocal phase shift not only stretches the pulse back out to an original duration, but also removes the phase errors imparted by the first pass through the chirped fiber Bragg grating. Thus, the chirped fiber Bragg grating implementation has very low residual phase errors and signal low loss, which do not scale with dispersion.

The time domain filter operating in the optical regime comprises an optical compressor, an optical time gate, and an optical expander. The compressor and expander can be dispersive elements. The optical time gate comprises an optical modulator driven by an electrical gate signal. The electrical gate signal can be derived from the optical pulse train from the optical pulse generator in the optical regime. The optical time gate includes an optical filter for filtering the optical pulse train into a filtered optical pulse train, which does not enter the chirper, providing an optical pulse signal, includes an optical delay for delaying the optical pulse signal, and includes an optical detector for detecting the optical pulse signal and generating the time gate signal in the electrical regime. The optical modulator modulates the optical time domain signal by the electrical gate time signal for providing the optical time filtered signal. As a result, synchronization between the modulation of the time domain signal and the optical pulse train is jitter free.

The optical time domain filter would include a compressor function, an optional expander function, and a time gate function, though implemented in the optical regime. The compressor is preferably used to remove chirp modulation from the modulated signal that can be an electrical or optical regime signal. The time gate is used to switch-out, attenuate, degrade, filter, or remove portions or components of the compressed waveform corresponding to the RF spectrum along a time line of gate timing. The expander is used to restore chirp modulation and modulate the baseband signal back into the frequency domain.

The DSB optical input is a DSB signal modulated onto a swept optical carrier. A swept optical carrier is typically created by chirping a broadband optical pulse using a dispersive element having a D1 dispersion parameter. The DSB optical signal is compressed in time by applying a dispersion of equal but opposite magnitude having a $-D1$ dispersion parameter. Analogous to spatial diffraction, a convolution occurs between the transform-limited pulse and the RF frequency spectrum of the signal. At the output of an optical compressor, the time-domain waveform resembles the RF spectrum of the signal. This time domain waveform may be manipulated in time in order to modify the RF spectrum. To produce a SSB signal, the time-gate is preferably utilized to switch out, remove, filter, or attenuate the upper or lower sideband. The original chirp modulation is restored in the time domain filter by the optional expander having an arbitrary dispersion parameter so as to provide a SSB modulated output signal.

A realization of an optical time-domain filter would use a wideband high-extinction optical modulator for filtering in the optical regime or use an electrical switch for filtering in the electrical regime. As the compressed waveform enters the modulator, a high-speed time-gate signal will be preferably used to remove the upper sideband signal component or the lower sideband signal component of the input signal. Ideally, the time-gate function will be an RF rectangular function that is synchronized to the compressed pulse capturing for filtering at least one time-domain component signal of the entire time-domain signal. A fast time-gate function may be obtained optically by tapping and splitting the chirped optical pulse before modulation. The profile of the time gate function can be shaped using an optical band pass filter, not shown, and converted into an RF signal by a broadband photodetector, not shown. The rise time of the rectangular gate function must be shorter than the time separation $\Delta t_{RF}$ between the center signal component of the waveform corresponding to DC and the first upper or lower RF sideband signal component. This $\Delta t_{RF}$ separation is less than one picosecond in a typical time-stretch preprocessor. To relieve the timing requirements of the gating device, a single tone may be mixed with the signal to increase the displacement of the sidebands from the carrier, which is also known as sub-carrier modulation.

The invention is directed to a time domain filtering method to achieve SSB modulation using conventional optical components and is capable of processing signals with bandwidths greater than 100 GHz. Single sideband modulation is an important signal format that can avoid frequency fading over dispersive optical fiber. The time-domain filtering provides a low-cost and practical solution to generate SSB analog signals beyond 100 GHz bandwidth in the optical regime with advantages for RF-photonic communications and signal processing. The process relies upon gating in the time-domain, rather than spectral filtering in the frequency domain, to remove one sideband and achieve a SSB waveform. The time domain filter avoids dispersion penalties that can severely degrade the performance of analog photonic systems. The optical time domain filter includes a compressor, time gate, and optional expander functions that can be applied to time-stretched photonic analog-to-digital converter functions. By inserting the proposed time-domain filter into the time-stretched photonic analog-to-digital converter, broadband SSB modulation can be achieved without dispersive nulling.

The time domain filter can perform ultra-broad bandwidth SSB modulation without a significant dispersion penalty. The time domain filter used for modulating ultra broadband signals onto chirped optical carriers. The time domain filter operates by compressing a modulated chirped optical carrier in time to produce a waveform, which mirrors the shape of the RF frequency spectrum. This time domain filter can be exploited to filter the RF spectra to generate SSB modulation signals by gating portions of the signal in the time domain. The time domain filter is preferably applied to chirped pulse modulated systems for eliminating the dispersion penalty. In the preferred form, the invention is directed to a time domain filter used for communicating single sideband signals and particularly applied to chirped modulated DSB signals. The time domain filter receives a double sideband input in the frequency domain. The input is preferably in the electrical or optical regimes within the RF spectrum. The time domain filter compresses this DSB input into a time domain signal that is then filtered by a time gate for providing a time filtered signal. The filtered signal is then expanded back into the frequency domain as a single sideband output with one sideband being filtered by the time gate. As such, the time domain filter translates a DSB signal input into an SSB signal output. The SSB output is particularly well suited for communicating chirped modulated signals as SSB signals along an optical fiber without dispersive nulling associated with communicating DSB signals along optical fibers. The time domain filter can also be applied to DSB electrical signals generated from chirped modulated electrical signals. The time domain filter is preferably applied to optical filtering to achieve single sideband modulation for wideband analog signals modulating on a swept optical carrier that is chirped modulated. The time domain filter is capable of generating single sideband signals with improved bandwidths that can be greater than 100 GHz. Those skilled in the art can make enhancements, improvements, and modifications to the invention, and these enhancements, improvements, and modifications may nonetheless fall within the spirit and scope of the following claims.

What is claimed is:

1. An optical filter for filtering frequency components of an input signal, the optical filter comprising:
    (a) a chirped Bragg grating configured to receive the input signal and to compress the input signal into a time domain signal; and
    (b) an optical time gate comprising a triggerable optical modulator configured to pass only a subset of the time domain signal,
    the chirped Bragg grating configured to receive the subset of the time domain signal passed by the optical modulator and to decompress the received subset into an output signal.

2. The optical filter of claim 1, wherein the input signal comprises a chirped carrier signal modulated by a baseband signal.

3. The optical filter of claim 2, wherein the input signal comprises upper and lower sideband component signals, the optical modulator being triggered so as to pass only one of the upper and lower sideband component signals.

4. The optical filter of claim 1, wherein the optical modulator comprises a Mach-Zehnder modulator.

5. The optical filter of claim 1, further comprising a first circulator configured to receive the input signal, to transmit the input signal to the chirped Bragg grating, to receive the time domain signal from the chirped Bragg grating, and to transmit the time domain signal to the optical time gate.

6. The optical filter of claim 5, further comprising a second circulator configured to receive the subset of the time domain signal from the modulator and to transmit the received subset of the time domain signal to the chirped Bragg grating for decompression.

7. The optical filter of claim 1, wherein the chirped Bragg grating comprises a chirped fiber Bragg grating.

8. The optical filter of claim 1, further comprising a signal generator configured to generate a gating signal comprising a pulsed function synchronized to the input signal.

9. An optical filter for filtering frequency components of an input signal, the optical filter comprising:
    (a) a first chirped Bragg grating configured to receive the input signal and to compress the input signal into a time domain signal;

(b) an optical time gate comprising a triggerable optical modulator configured to pass only a subset of the time domain signal; and (c) a second chirped Bragg grating configured to receive the subset of the time domain signal passed by the optical modulator and to decompress the received subset into an output signal.

10. The optical filter of claim 9, wherein the input signal comprises a chirped carrier signal modulated by a baseband signal.

11. The optical filter of claim 10, wherein the input signal comprises upper and lower sideband component signals, the optical modulator being triggered so as to pass only one of the upper and lower sideband component signals.

12. The optical filter of claim 9, wherein the optical modulator comprises a Mach-Zehnder modulator.

13. The optical filter of claim 9, further comprising a first circulator configured to receive the input signal, to transmit the input signal to the first chirped Bragg grating, to receive the time domain signal from the first chirped Bragg grating, and to transmit the time domain signal to the optical time gate.

14. The optical filter of claim 13, further comprising a second circulator configured to receive the subset of the time domain signal from the modulator and to transmit the received subset of the time domain signal to the second chirped Bragg grating for decompression.

15. The optical filter of claim 9, wherein each of the first and second chirped Bragg gratings comprises a chirped fiber Bragg grating.

16. The optical filter of claim 9, further comprising a signal generator configured to generate a gating signal comprising a pulsed function synchronized to the input signal.

\* \* \* \* \*